Jan. 8, 1952
M. GIANOLI
2,581,851
ROBOT TURN CONTROLLING DEVICE FOR AIRPLANES
Filed May 21, 1946
2 SHEETS—SHEET 1
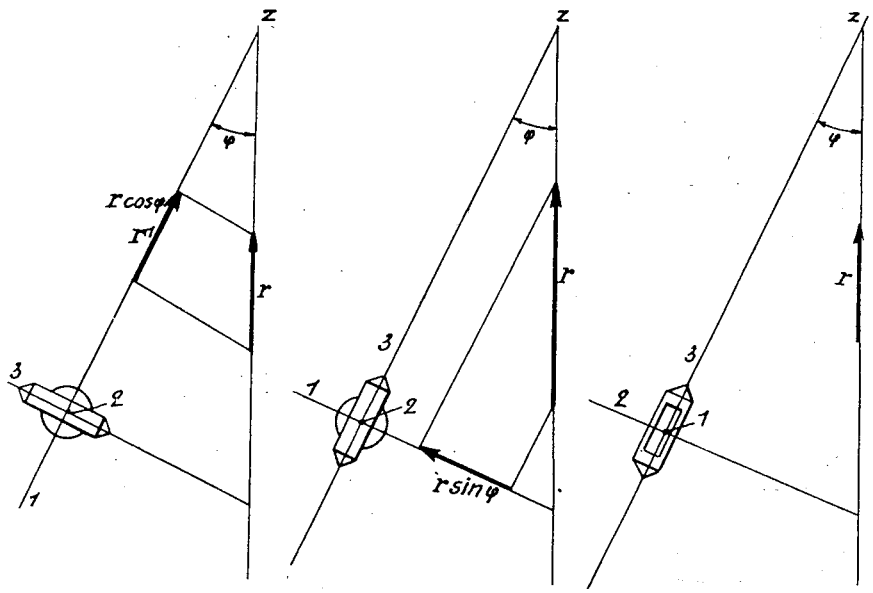
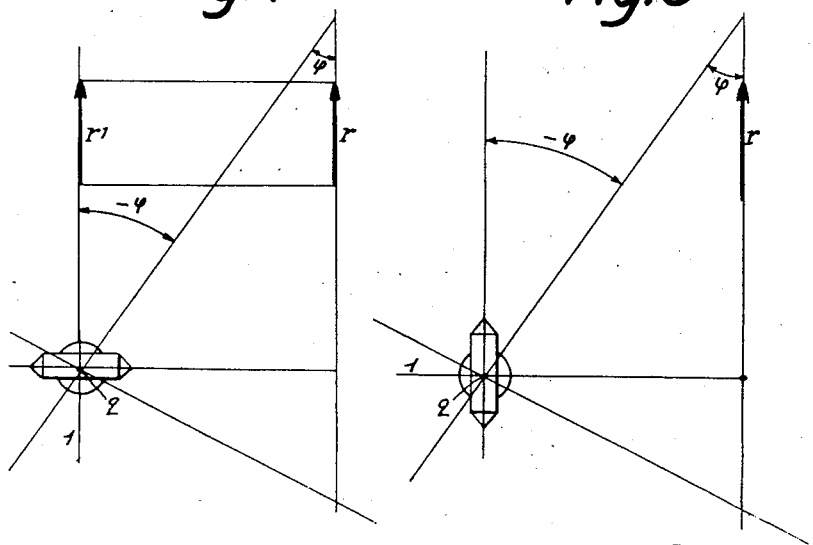
Inventor
MARCEL GIANOLI
By Haseltine, Lake & Co.
Attorneys Jan. 8, 1952 M. GIANOLI 2,581,851
ROBOT TURN CONTROLLING DEVICE FOR AIRPLANES
Filed May 21, 1946 2 SHEETS—SHEET 2
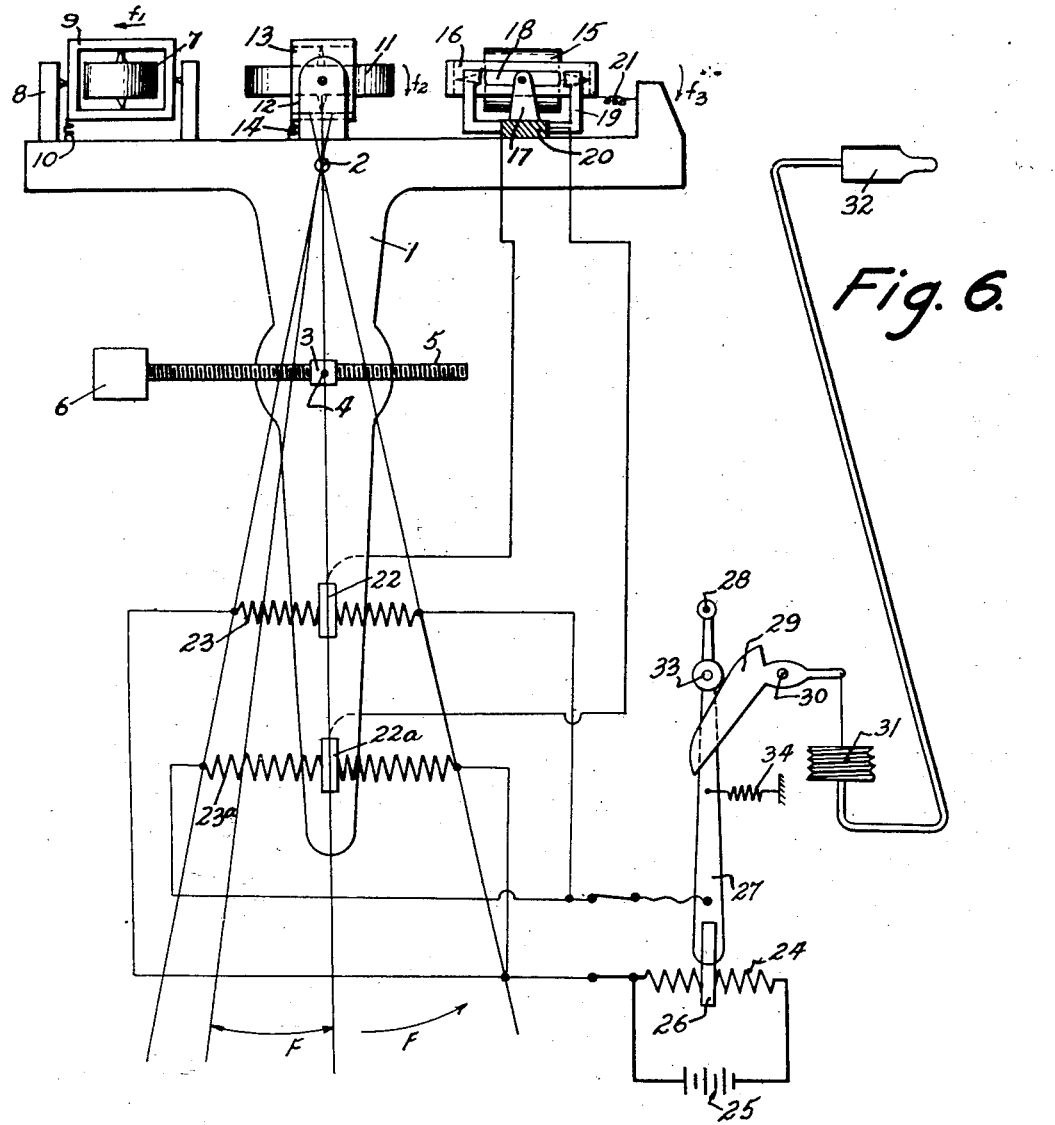
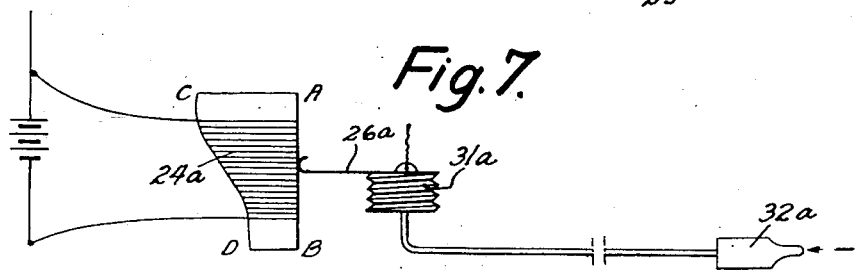
Inventor
MARCEL GIANOLI
By Haseltine, Lake & Co.
Attorneys Patented Jan. 8, 1952

2,581,851

UNITED STATES PATENT OFFICE 2,581,851

ROBOT TURN CONTROLLING DEVICE FOR AIRPLANES

Marcel Gianoli, Neuilly-sur-Seine, France, assignor to Societe Civile D'Etudes De Constructions Aeronautiques E. C. A., Paris, France Application May 21, 1946, Serial No. 671,150
In France May 28, 1945

8 Claims. (Cl. 244—77)

This invention relates to automatic piloting or robot devices for airplanes wherein control surface adjustment is derived from the responses of gyroscopes. Among such devices those which relate to the control of yawing and pitching movements are affected by rolling movements of the plane. While the rolling movements which are manifested by transverse oscillations of short duration of the plane are of no consequence, it is a different matter when the plane maintains a lateral inclination or heel for a long time, as is the case in a turn. The indications of the yawing and pitching gyroscopes are altered through the effect of such lateral inclination. If the gyroscope is gimbel supported, its positioning in the gimbals varies during the turn and the law governing the detection of angular deviations is varied. If it is supported in such a way as to have only two axes of free motion, the error is then not even compensated from one gimbel to another, inasmuch as the precession moment applied to the rotor of the gyroscope is proportional to the projection of the speed of the displacement of the aircraft on an axis perpendicular to the plane difined by the axis of rotation of the rotor and the axis of precession.

With a view to overcoming this drawback, the main object of the invention is to provide a turn controlling device for airplanes wherein the gyroscopes having two degrees of freedom provided for pitch and yaw control are supported on a frame which is pivotally mounted with respect to the airplane about an axis parallel to the rolling axis, said frame being coupled with control means which act to impress thereon relative angular displacements with respect to the plane of symmetry of the craft which are equal and reverse to the rolling angles.

While the disturbing effects of rolling only affect the yaw and pitch controlling gyroscopes, the present invention has for other object to provide, in a turn controlling device of the character described, the mounting of the roll controlling gyroscope having two degrees of freedom on the pivotable frame as outlined above. Such mounting makes it possible to initiate a turn for the airplane by rocking the frame through an angle equal to the angle of transverse inclination which it is desired to impart to the airplane. The rolling detector then reacts with respect to the frame, imparting to the airplane an angle of transverse inclination equal and opposite to that through which the frame has been rocked. During such movement of the frame, the pitch detector is not affected, and it is merely necessary to impress upon the yaw detector a command impulse directly proportionate to the rocking angle of the frame and in inverse ratio to the velocity of flight. This is so because the inclination of the frame may be expressed by to the following equation:

$$\tan \varphi = KrV$$

wherein $r$ and $V$ respectively represent the yawing and flight velocities.

The command to be transmitted to the yaw detector is therefore given by the following equation:

$$r = \frac{\tan \varphi}{KV}$$

Another object of the invention is to provide a turn controlling device of the character described wherein the relative command impulse is transmitted to the yaw controlling gyroscope from an electric circuit the energizing of which is under the control of both the angular position of the frame and the flying speed of the airplane.

The accompanying drawings given by way of example only are explanatory diagrams of the present invention and of devices embodying the above specified features thereof.

In the drawings:

Fig. 1 is a schematic diagram showing a yaw controlling gyroscope submitted to a gyration, Fig. 2 shows diagrammatically a pitch controlling gyroscope submitted to a gyration;

Fig. 3 shows diagrammatically a roll controlling gyroscope submitted to a gyration;

Fig. 4 is similar to Fig. 1, the resulting precession moment being corrected;

Fig. 5 is similar to Fig. 2, the resulting precession moment being corrected;

Fig. 6 shows schematically a turn controlling device according to the invention, comprising a potentiometer actuated by an anemometer for controlling the energization of the electrical circuit.

Fig. 7 shows an alternative embodiment of the turn controlling device wherein the slider of the potentiometer is directly coupled to the anemometer.

In the explanatory diagrams of Figs. 1 to 5, there are shown detectors comprising gyroscopes having two degrees of freedom. As shown in Fig. 1, which relates to the yaw controlling gyroscope, the precession moment applied to the gyroscope for a gyration represented by the vector $r$ is proportional to the projection $r_1$ of said vector on an axis 1 normal to the plane defined by the axis of rotation 2 of the gyroscope rotor and the axis of precession 3. Therefore, this gyroscope only detects, out of the gyration $r$, the portion $r_1 = r \cos \varphi$.

The pitch controlling gyroscope shown in Fig. 2 quite erroneously detects the portion $r \sin \varphi$ of the speed $r$, although the aircraft does not move out of a horizontal plane. The roll controlling gyroscope shown in Fig. 3 alone is not affected since the axis of projection 1 is perpendicular to the direction of gyration $r$. However, the roll controlling gyroscope is operative to oppose the rolling movements which the plane has to go through at the start and at the end of the turn. This fact is a drawback in that it is necessary to apply a compensating couple to the detector.

It will thus be seen that the corrections which should be applied to the various detecting gyros in order to obviate the drawback which has just been described, are expressed by complicated trigonometric functions of the angle of transverse inclination. The expedient according to the present invention provides a simple solution for the problem arising from the need for such corrections. It consists in supporting the various detecting gyros on a frame pivotally mounted about an axis parallel to the rolling axis, and rocking said cradle through an angle equal and reverse to the angle of inclination of the plane. In this way, the gyroscopes are maintained in a horizontal position and the above mentioned errors are eliminated as shown in Fig. 4 in the case of yawing, and in Fig. 5 in that of pitching.

The above arrangement is not only advantageous in connection with yaw and pitch detecting gyros, but it is also useful in connection with rolling detecting gyros. The turning of the aircraft may be effected by rocking the supporting frame through an angle equal to the inclination which it is desired to impart to the plane. The rolling gyro responds to such a movement of the frame by rocking the plane through an equal and reverse angle so as to itself remain stationary in space. The pitch gyro is subjected to no reaction and remains substantially correct. As for the yaw detector, it is simply necessary to apply thereto a command impulse directly proportional to said rocking angle and inversely proportional to the speed of flight as explained above.

The diagram in Fig. 6 illustrates, by way of example, an embodiment of the device for controlling the rocking movement of the frame supporting the gyroscopic detectors. The supporting frame 1 pivotally mounted about a fixed axis 2 parallel to the rolling axis, carries a nut 3 journaled at 4 and threadedly engaged by a screw 5 rigidly connected with the shaft of an electric motor 6 which may be started for rotation in either direction as desired by the pilot, by means of a suitable switch (not shown). On the frame 1 is mounted a roll controlling gyroscope 7 by means of a supporting member 8 and a gimbal ring 9 which is returned in rest position by a release spring 10. Similarly a pitch controlling gyroscope 11 is mounted on the frame 1 by means of a supporting member 12 and a gimbal ring 13 which is returned in rest position by a release spring 14.

Finally the frame 1 carries a yaw controlling gyroscope 15 supported by a gimbal ring 16 pivotally mounted on a supporting member 17. Said gimbal ring 16 carries a magnet 18 forming the armature of a stationary electro-magnet 19 provided with a field coil 20. A release spring 21 acts for returning the gimbal ring 16 in rest position.

The frame 1 carries a pair of sliders 22, 22a movable across resistors 23, 23a shunted across the terminals of a potentiometer 24 supplied from a source 25. The slider 26 of the potentiometer is carried by a lever 27 fulcrumed on a fixed point 28 and the angular positioning of which is determined by the corresponding angular position of a cam 29 pivoted at 30 and secured to the movable bottom of a bellows 31 of an anemometer 32.

The profile of the cam 29 which engages the follower roller 33 of the lever 27 urged into engagement therewith by a spring 34 is such that the displacements of the slider 26 on the resistor of the potentiometer are inversely proportional to the speed as measured by the anemometer.

The sliders 22, 22a are connected by a bridge formed by the field coil 20 which is to apply to the yaw controlling gyroscope the turning command impulse $r$. Considering that the displacements of the sliders 22, 22a on the resistors 23, 23a are proportional to $\tan \varphi$ when the pilot has rocked the frame 1 through an angle equal to $\varphi$, it is possible to obtain for the voltage picked up between the sliders 22, 22a, a value proportional to $$\frac{\tan \varphi}{V} = r$$

When a gyration $\varphi$ is to be applied to the aircraft according to arrow F, the pilot operates the motor 6 for rocking the frame 1 through an angle $-\varphi$. The roll controlling gyroscope 7 detects said angle F and impresses to the craft an inclination $\varphi$ equal and in reverse direction to that of the frame 1 so that said frame remains horizontal. Simultaneously the sliders 22 and 22a are moved relatively to resistors 23 and 23a in direct ratio with $\tan \varphi$. Their action being associated with that of the slider 26 moving on resistor 24 in reverse ratio with the speed V as measured by the anemometer 32, the voltage of the current picked up between the sliders 22 and 22a has a value proportional to $$\frac{\tan \varphi}{V} = r$$

Said current energizes the field coil 20 inducing a displacement for the gimbal ring 16 and consequently for the yaw controlling gyro such that the yawing movement of the craft is correct in relation with the actual speed thereof and the impressed gyration.

Instead of using a cam, the slider 26a of the potentiometer may, as shown in Fig. 7, be directly connected to the bellows 31a of the anemometer, the displacements thereof being proportional to $V^2$. The potential having a value expressed by $1/V$ is obtained by winding the resistor of the potentiometer about an insulating member constituted by a plate comprising a straight edge A—B which the slider 26a is caused to slidingly engage, the profile of the opposite edge C—D being so chosen that the length of the coils is suitably variable from one end of the winding to the other.

What I claim as my invention and desire to secure by Letters Patent is:

1. In turn controlling device for aircraft, a frame pivotally mounted on an axis parallel to the rolling axis of the craft, means for imparting to said frame an angular movement around said rolling axis from a level to a laterally inclined position, means for simultaneously imparting to said craft a rolling movement equal to and in reverse direction with respect to the angular movement of said frame and for moving said frame back to said level position from said laterally inclined position, and means for imparting to said craft a yawing movement in direct ratio with said rolling movement and in reverse ratio with the speed of flight.

2. In turn controlling device for aircraft, a frame pivotally mounted on an axis parallel to the rolling axis of the craft, means for imparting to said frame an angular movement around said rolling axis from a level to a laterally inclined position, means for simultaneously imparting to said craft a rolling movement equal to and in reverse direction with respect to the angular movement of said frame and for moving said frame back to said level position from said laterally inclined position, a yaw controlling gyroscope mounted on said frame, and means for imparting to said gyroscope a movement in direct ratio with said rolling movement and in reverse ratio with the speed of flight.

3. In turn controlling device for aircraft, a frame pivotally mounted on an axis parallel to the rolling axis of the craft, means for imparting to said frame an angular movement around said rolling axis from a level to a laterally inclined position, a rolling controlling gyroscope having two degrees of freedom mounted on said frame for simultaneously imparting to said craft a rolling movement equal to and in reverse direction with respect to the angular movement of said frame and moving said frame back to said level position from said laterally inclined position, and means for imparting to said craft a yawing movement in direct ratio with said rolling movement and in reverse ratio with the speed of flight.

4. In turn controlling device for aircraft, a frame pivotally mounted on an axis parallel to the rolling axis of the craft, means for imparting to said frame an angular movement around said rolling axis from a level to a laterally inclined position, a rolling controlling gyroscope having two degrees of freedom mounted on said frame for simultaneously imparting to said craft a rolling movement equal to and in reverse direction with respect to the angular movement of said frame and moving said frame back to said level position from said laterally inclined position, a pitch controlling gyroscope mounted on said frame, a yaw controlling gyroscope mounted on said frame, and means for imparting to said yaw controlling gyroscope a movement in direct ratio with said rolling movement and in reverse ratio with the speed of flight.

5. In turn controlling device for aircraft, a frame pivotally mounted on an axis parallel to the rolling axis of the craft, means for imparting to said frame an angular movement around said rolling axis from a level to a laterally inclined position, a rolling controlling gyroscope having two degrees of freedom mounted on said frame for simultaneously imparting to said craft a rolling movement equal to and in reverse direction with respect to the angular movement of said frame and moving said frame back to said level position from said laterally inclined position, a pitch controlling gyroscope mounted on said frame, a yaw controlling gyroscope mounted on said frame, control means for acting upon the yaw controlling gyroscope, said control means being electric control means, and actuating means adapted to actuate said electric control means an amount directly proportional to the rocking angle of said frame and inversely proportional to the speed of flight.

6. A turn controlling device, according to claim 5, wherein the means for actuating the electric control means comprises a pair of resistors, an electric power supply circuit which forms a bridge across said pair of resistors, two sliders carried by the frame for engaging respectively the middle points of said resistors when said frame is in level position and for supplying current to said electric control means in accordance with the position of said sliders, a potentiometer for supplying said two resistors, and means for causing said potentiometer to supply current to said resistors in inverse ratio to the flying speed.

7. A turn controlling device, according to claim 6, wherein the means for causing the potentiometer to supply current in inverse ratio to the flying speed comprises a slider for said potentiometer, an anemometer for measuring the speed of flight, and a cam adapted to be actuated by said anemometer and to control said slider, the profile of said cam being determined for imposing to said slider displacements inversely proportional to the speed of flight.

8. A turn controlling device, according to claim 6, wherein the means for causing the potentiometer to supply current in inverse ratio to the flying speed comprises an anemometer for measuring the speed of flight, a coiled resistance, a rectilineally movable arm adapted to be actuated by said anemometer and to slide on said resistance, and a plate upon which said resistance is wound and provided with a rectilineal edge facing said movable arm and with an opposite edge the profile of which is such that the length of the coils of said resistance is variable so that the potential at the point of contact of said movable arm is inversely proportional to the speed of flight.

MARCEL GIANOLI.

REFERENCES CITED

The following references are of record in the file of this patent:

UNITED STATES PATENTS

| Number | Name | Date |
| --- | --- | --- |
| 1,709,457 | Boykow | Apr. 16, 1929 |
| 1,826,013 | Meredith | Oct. 6, 1931 |
| 2,005,530 | Boykow | June 18, 1935 |
| 2,286,561 | Meredith | June 16, 1942 |
| 2,307,941 | Meredith | Jan. 12, 1943 |